(12) United States Patent
Axelrod et al.

(10) Patent No.: US 9,295,233 B2
(45) Date of Patent: Mar. 29, 2016

(54) PET TOY HAVING A DECORATIVE SHEET ENCLOSED IN A TRANSPARENT OUTER SHELL

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 182 days.

(21) Appl. No.: 14/079,081

(22) Filed: Nov. 13, 2013

(65) Prior Publication Data

US 2015/0128876 A1    May 14, 2015

(51) Int. Cl.
*A01K 11/00* (2006.01)

(52) U.S. Cl.
CPC ..................... *A01K 15/026* (2013.01)

(58) Field of Classification Search
CPC .... A01K 15/025; A01K 15/026; A01K 25/02
USPC .................................. 119/707, 709, 710, 711
See application file for complete search history.

(56) References Cited

U.S. PATENT DOCUMENTS

| | | | | |
|---|---|---|---|---|
| 3,484,876 | A * | 12/1969 | Thomas | A47K 13/02 4/234 |
| 5,339,771 | A * | 8/1994 | Axelrod | A01K 15/026 119/710 |
| 5,754,984 | A | 5/1998 | Bermudez-Schmeelk | |
| 6,918,355 | B1 * | 7/2005 | Arvanites | A01K 15/026 119/707 |
| 7,832,362 | B2 * | 11/2010 | DeGhionno | A01K 5/0114 119/707 |
| 8,727,918 | B1 * | 5/2014 | Gentile | A01K 15/025 473/570 |
| 9,131,813 | B2 * | 9/2015 | Zhang | A47K 13/24 |
| 2006/0088629 | A1 * | 4/2006 | Otto | A01K 15/026 426/87 |
| 2007/0087861 | A1 * | 4/2007 | Liao | A63B 37/0003 473/353 |
| 2007/0135201 | A1 | 6/2007 | Guzman | |
| 2007/0240579 | A1 | 10/2007 | Boake | |
| 2009/0114167 | A1 * | 5/2009 | Axelrod | A01K 15/026 119/710 |
| 2010/0083910 | A1 | 4/2010 | Axelrod et al. | |
| 2010/0186682 | A1 * | 7/2010 | Myers, Jr. | A01K 15/026 119/709 |
| 2011/0214616 | A1 * | 9/2011 | Levin | A01K 15/00 119/707 |
| 2012/0114802 | A1 | 5/2012 | Langiotti Swank et al. | |
| 2013/0115400 | A1 | 5/2013 | Chou | |

OTHER PUBLICATIONS

International Search Report and Written Opinion from related PCT Appln. No. PCT/US2014/61699 dated Dec. 19, 2014.

* cited by examiner

*Primary Examiner* — Brian M O'Hara
*Assistant Examiner* — Morgan T Barlow
(74) *Attorney, Agent, or Firm* — Grossman, Tucker & Perreault & Pfleger, PLLC (57) ABSTRACT

A pet toy including: an elongated member in the form of a bone, the elongated member including a first member and a second member, the first member and the second member each having a front side and arranged juxtaposed to one another with the front sides facing in opposite directions; the first member including a transparent first member decorative sheet, the first member decorative sheet located between a first member outer shell and a first member inner lining; and the second member comprises including a transparent second member decorative sheet, the second member decorative sheet located between a second member outer shell and a second member inner.

40 Claims, 9 Drawing Sheets

100
PET TOY HAVING A DECORATIVE SHEET ENCLOSED IN A TRANSPARENT OUTER SHELL

FIELD OF THE INVENTION

The present disclosure relates to a molded pet toy, and more particularly to a molded pet toy which may include two members juxtaposed one another wherein each member includes a decorative sheet enclosed in a transparent plastic outer shell.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with chew toys. The interaction between animals and their owners has reportedly been found to be not only beneficial to the animal, as it provides the animal with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. For example, it may also be useful to provide chew toys that are interesting not only to animals, but to the animal owners as well. Additionally, it may also be useful to provide chew toys that enhance the visual characteristics of the chew toy to the animal or owner. Accordingly, an animal toy of novel construction may be directed to sparking the interest of, not only the animal, but children, teenage or adult owners, which may increase the time period that owners engage with their animals.

More particularly, it may be preferred that chew toys have a reasonable durability and maintain the interest of the animal for more than one interaction. To such end, it may be preferred that such chew toys comprise a decorative sheet located between a transparent plastic outer shell a plastic inner lining, wherein the chew toy presents that appearance of the decorative sheet being enclosed within the chew toy beneath the transparent plastic outer shell.

SUMMARY

The present disclosure provides various embodiments of molded pet toys which may offer certain benefits as compared to pet toys known in the art.

In certain embodiments of the disclosure, a pet toy is provided which comprises an elongated member in the form of a bone, the elongated member comprising a first member and a second member, wherein the first member and the second member each have a front side and are arranged juxtaposed to one another with the front sides facing in opposite directions; wherein the first member comprises a first member decorative sheet, wherein the first member decorative sheet is located between a first member outer shell and a first member inner lining; wherein each of the first member decorative sheet, the first member outer shell and the first member inner lining are formed of plastic, and wherein the plastic of the first member outer shell is a transparent plastic; wherein the second member comprises a second member decorative sheet, wherein the second member decorative sheet is located between a second member outer shell and a second member inner lining; and wherein each of the second member decorative sheet, the second member outer shell and the second member inner lining are formed of plastic, and wherein the plastic of the second member outer shell is a transparent plastic.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

In an exemplary embodiment of the present disclosure, as illustrated in FIGS. 1-5, a molded pet chew toy 10 is shown in the form of an elongated member 12, and more particularly in the form of a bone, with the elongated member 12 comprising a first member 12a and a second member 12b. As shown, the first member 12a and the second member 12b each have a front side 13a, 13b, respectively, and are arranged juxtaposed to one another with the front sides 13a, 13b facing in opposite directions. As explained below, molded pet chew toy 10 is formed by first forming the first member 12a and the second member 12b separately, substantially as halves of elongated member 12, and then joining the first member 12a and the second member 12b together.

Figure 2:
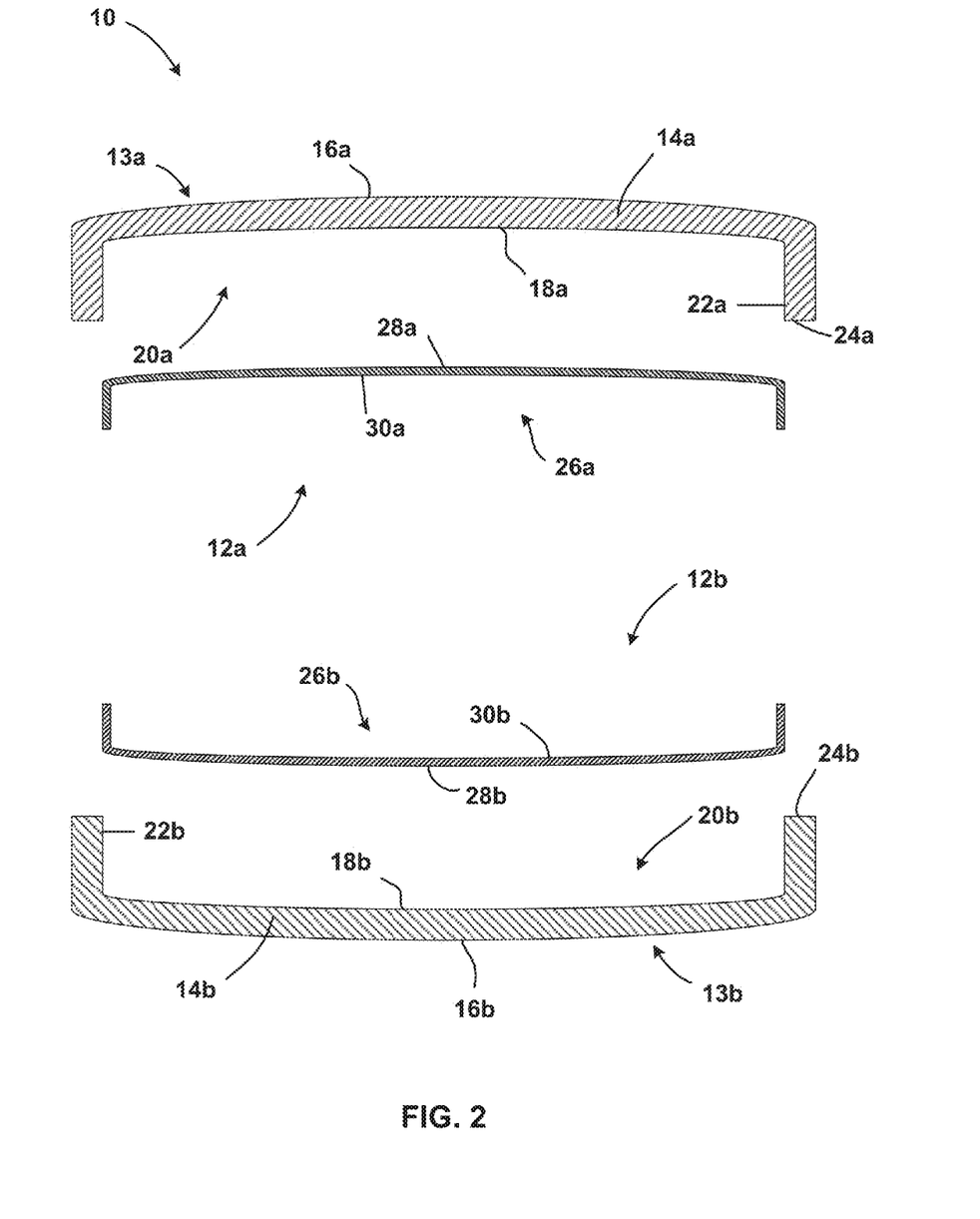
FIG. 2 is an exploded cross-sectional view taken along line 2-2 of FIG. 1 of first and second members of the pet chew toy of FIG. 1 prior to assembly, wherein each of the first and second members includes a transparent outer shell and a decorative sheet.

As shown by FIG. 2, first and second members 12a, 12b each respectively comprise an outer shell 14a, 14b. First and second member outer shells 14a, 14b are formed of a thermoplastic polymer composition. More particularly, first and second member outer shells 14a, 14b may be high-pressure (e.g. injection pressure of 1,000-2,000 psi.) injection molded from a transparent thermoplastic polymer composition, which may particularly be transparent without tint and which may include acrylic (e.g. polymethyl methacrylate), plasticized polyvinyl chloride, polycarbonate and/or polyurethane, as well as thermoplastic elastomers.

As used herein, an elastomer may include any polymer material with a glass transition temperature Tg below room temperature and which is at most, 50% crystalline (i.e., the material contains an amorphous phase of 50% or greater, up to 100% amorphous phase). The elastomer may also be characterized as a material that has an elongation at 23° C. of at least 100%, and which, after being stretched to twice its original length and being held at such for one minute, may recover in a range of 50% to 100% within one minute after release from the stress. More particularly, the elastomer may recover in a range of 75% to 100% within one minute after release from the stress, and even more particularly recover in a range of 90% to 100% within one minute after release from the stress.

Exemplary elastomers may include styrene block polymers, such as styrene block copolymers (e.g. styrene-butadiene copolymer) and styrene block terpolymers (e.g. styrene-butadiene-styrene terpolymer, styrene-ethylene/butylene-styrene terpolymer, styrene-ethylene/propylene-styrene terpolymer); polyolefin blends (e.g. polypropylene and ethylene-propylene-diene monomer rubber, polypropylene and nitrile rubber, ethylene-propylene rubber); elastomeric alloys such as melt-processable rubbers and thermoplastic vulcanizates; polyolefins; polyurethanes; polyesters; and rubbers such as natural rubber, neoprene rubber, acrylic rubber, butadiene rubber, butyl rubber, ethylene-propylene rubber, ethylene propylene diene monomer rubber, fluorocarbon rubber, isoprene rubber, nitrile rubber, polyurethane rubber and silicone rubber.

First and second member outer shells 14a, 14b may have a thickness in a range of 1.5 mm to 5 mm, and more particularly a thickness in a range of 2.5 to 3.5 mm. In certain embodiments, the material of the first and second member outer shells 14a, 14b may have a Shore A hardness (ASTM D2240-05 (2010)) of less than 65, including all values and increments therein, including less than 60, less than 50 and less than 40. Furthermore, the material of the first and second member outer shells 14a, 14b may have a flexural modulus (ASTM D-790-10) of less than 90,000 psi., including all values and increments therein, including less than 80,000 psi, less than 60,000 psi. and less than 40,000 psi.

The thermoplastic polymer composition for first and second member outer shells 14a, 14b may also include at least one additive, such as a scent attractant to attract the pet.

First and second member outer shells 14a, 14b each include an outer surface 16a, 16b and an inner surface 18a, 18b, respectively. Each outer shell 14a, 14b may also be formed with an inner recess such that an inner (internal) cavity 20a, 20b is formed on the inner side of each outer shell 14a, 14b, respectively.

Each of first and second members 12a, 12b further respectively comprise first and second member decorative sheets 26a, 26b, which are formed from a thermoplastic polymer composition. First member decorative sheet 26a has an outer surface 28a and an inner surface 30a, and is placed in first member inner cavity 20a, while second member decorative sheet 26b has an outer surface 28b and an inner surface 30b, and is placed in second member inner cavity 20b. First member and second member decorative sheet 26a, 26b may each have a thickness in a range of 0.05 mm to 1 mm, and more particularly a thickness in a range of 0.2 mm to 0.5 mm. As used herein, a sheet should be understood as an item, which may be in the form of a continuous (impermeable) layer, having a narrow thickness as compared to its length and width.

Each of first and second member sheets 26a, 26b may be preformed to have a perform shape corresponding to a shape of the first and second member outer shell inner surfaces 18a, 18b, respectively. More particularly, sheets 26a, 26b may be thermoformed, which may also include vacuum forming or pressure forming, from a planar (flat) sheet. In this manner, each of first and second member sheets 26a, 26b may respectively fit within first and second member cavities 20a, 20b with the outer surfaces 28a, 28b thereof nested against the inner surfaces 18a, 18b of first and second member outer shells 14a, 14b. The first and second member sheets 26a, 26b may respectively cover the inner surfaces 18a, 18b of the first and second member outer shells 14a, 14b except for narrow perimeter regions 22a, 22b of the inner surfaces 18a, 18b adjacent a perimeter edge 24a, 24b of first and second member outer shells 14a, 14b.

In certain embodiments, each of first and second member sheets 26a, 26b may be formed of a transparent thermoplastic polymer composition, which may include acrylic (e.g. polymethyl methacrylate), plasticized polyvinyl chloride, polycarbonate and/or polyurethane, as well as thermoplastic elastomers.

In certain embodiments, each of first and second member sheets 26a, 26b may be edible (such as being formed of potato starch and soy lecithin) in the event that a pet (e.g. dog) is able to bite or chew through the the first and second member outer shells 14a, 14b.

At least one of the outer surface 28a and the inner surface 30a of first member sheet 26a may include a decorative image 32a thereon (see FIG. 1 which shows an image of food in the form of a bone), which may be formed by silk-screening, or by digital printing. Similarly, at least one of the outer surface 28b and the inner surface 30b of second member sheet 26b may include a decorative image 32b thereon, which may be the same as image 32a. As used herein, a decorative image may include any design(s), picture(s), graphic(s) and/or text(s), as well as any word(s), symbol(s), pattern(s) logo(s) and/or color(s)

Figure 1:
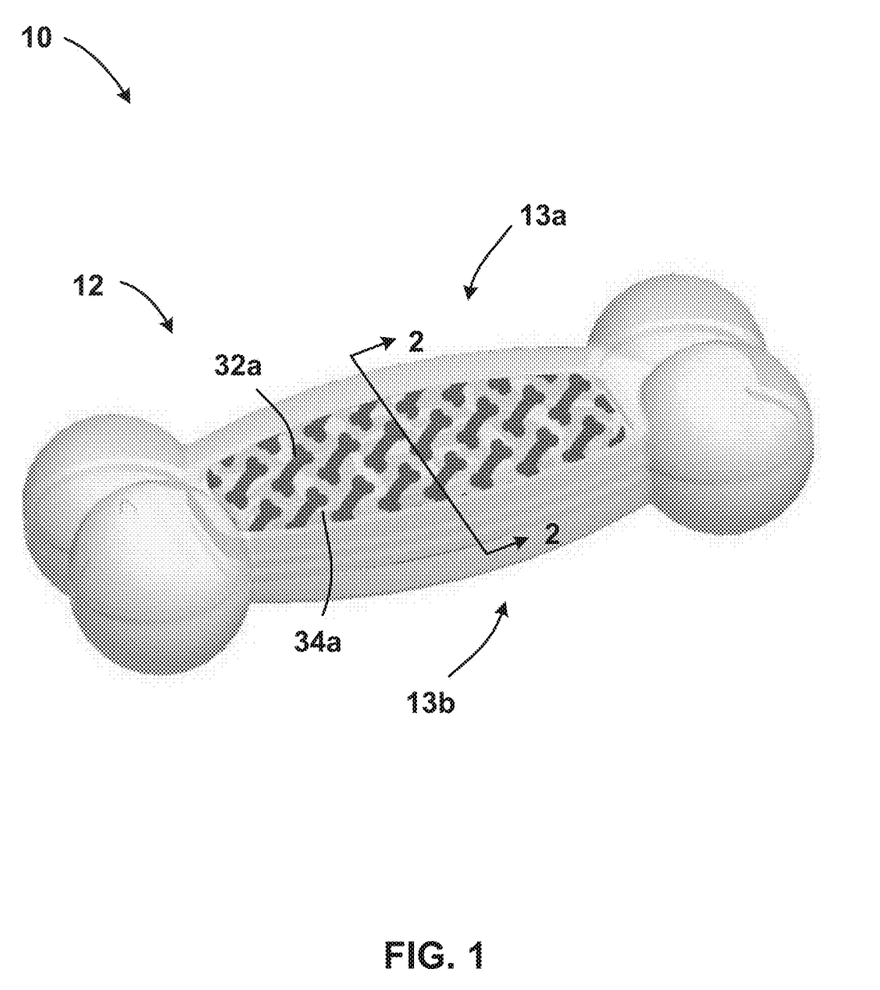
FIG. 1 is a perspective view of a pet chew toy in the form of a bone according to the present disclosure.

When first and second member outer shells 14a, 14b are molded from a transparent thermoplastic polymer composition, the first and second member decorative images 32a, 32b are visible through first and second member outer shells 14a, 14b, respectively. As shown in FIG. 1, first and second member sheet decorative images 32a, 32b may only be present on certain regions of the first and second member sheets 26a, 26b, resulting in regions 32a, 32b of the first and second member sheets 26a, 26b which are opaque while other regions 34a, 34b remain transparent. As such, as used herein, "transparent" means having the property of being sufficiently clear such that an individual consumer with 20/20 vision holding the pet chew toy 10 at arms length can view the first and second member decorative images 32a, 32b through the first and second member outer shells 14a, 14b and discern or otherwise identify the decorative image 32a, 32b.

Figure 3:
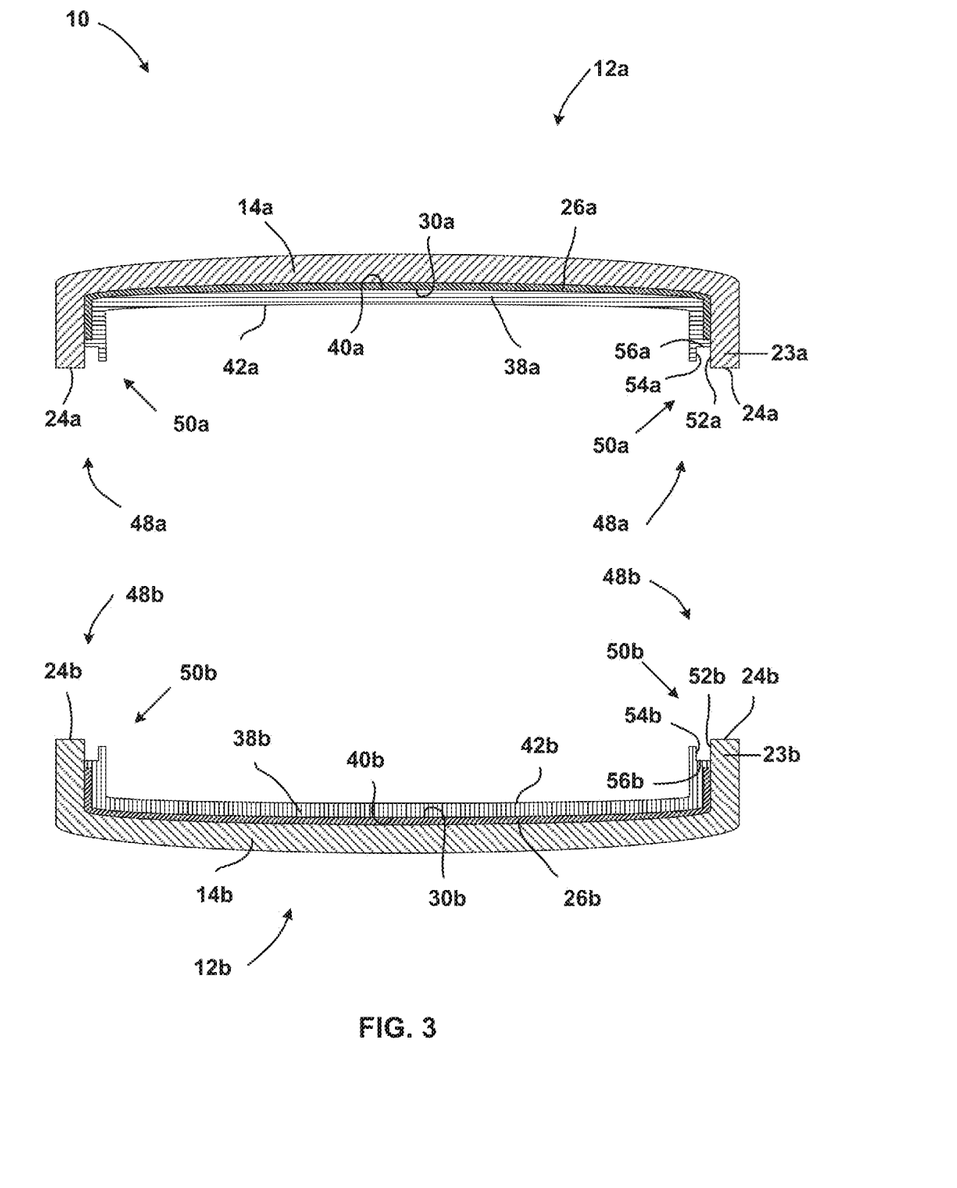
FIG. 3 is a cross-sectional view taken along line 2-2 of FIG. 1 of the first and second members of the pet chew toy of FIG. 1 after each decorative sheet has been placed within a cavity of each transparent outer shell and backed by a plastic inner lining.

As shown by FIG. 3, after first and second member sheets 26a, 26b have respectively been placed in the inner cavities 20a, 20b of the first and second member outer shells 14a 14b, first and second member inner linings 38a, 38b may be formed in the inner cavities 20a, 20b from a thermoplastic polymer composition. More particularly, first and second member inner linings 38a, 38b may be high-pressure injection molded from a transparent thermoplastic polymer composition, which may particularly be transparent without tint and which may include acrylic (e.g. polymethyl methacrylate), plasticized polyvinyl chloride, polycarbonate and/or polyurethane, as well as thermoplastic elastomers. In certain embodiments, the material of the first and second member inner linings 38a, 38b may be the same material used for the first and second member outer shells 14a, 14b.

As shown, after first and second member inner linings 38a, 38b are formed, the first and second member sheets 26a, 26b are respectively located between the first and second member outer shells 14a, 14b and the first and second member inner linings 38a, 38b. Also as shown, first and second member inner linings 38a, 38b may respectively fill and occupy only a portion of inner cavities 20a, 20b of first and second member outer shells 14a 14b. In other words, after first and second member inner linings 38a, 38b are formed and respectively fill a portion of the first and second member inner cavities 20a, 20b, a remaining unfilled potion of each of first and second member inner cavities 20a, 20b may still exist.

As shown, first and second member inner linings 38a, 38b respectively have outer surfaces 40a, 40b and inner surfaces 42a, 42b. First and second member inner lining outer surfaces 40a, 40b may respectively bond to the inner surfaces 30a, 30b of the first and second member sheets 20a, 20b as well as the exposed inner surfaces 18a, 18b of the first and second member outer shells 14a, 14b, particularly the narrow perimeter regions 22a, 22b of the inner surfaces 18a, 18b adjacent perimeter edges 24a, 24b of the first and second member outer shells 14a, 14b.

As further shown by FIG. 3, first and second members 12a, 12b may respectively include intermediate member seating portions 48a 48b, which extend around a perimeter of the first and second members 12a, 12b. As explained in greater detail below. intermediate member seating portions 48a, 48b are configured to mate with an intermediate member 60 to be located therein, and which is used to hold the first member 12a, the second member 12b and the intermediate member 60 in a fixed position relative to one another during the final step of assembly of molded pet toy 10.

As shown, intermediate member seating portion 48a, 48b of first and second members 12a, 12b may respectively comprise U-shaped elongated recessed channels 50a, 50b formed as a continuous loop adjacent perimeter edges 24a, 24b of the first and second outer shells 14a, 14b. More particularly, U-shaped recessed channels 50a, 50b may each have an outer side wall 52a, 52b formed by narrow perimeter region 23a, 23b of first and second member outer shells 14a, 14b; and an inner side wall 54a, 54b formed by first and second member inner linings 38a, 38b; and an intermediate member seat 56a, 56b at the bottom of the U-shaped recessed channel 50a, 50b formed by first and second member inner linings 38a, 38b.

Figure 4:
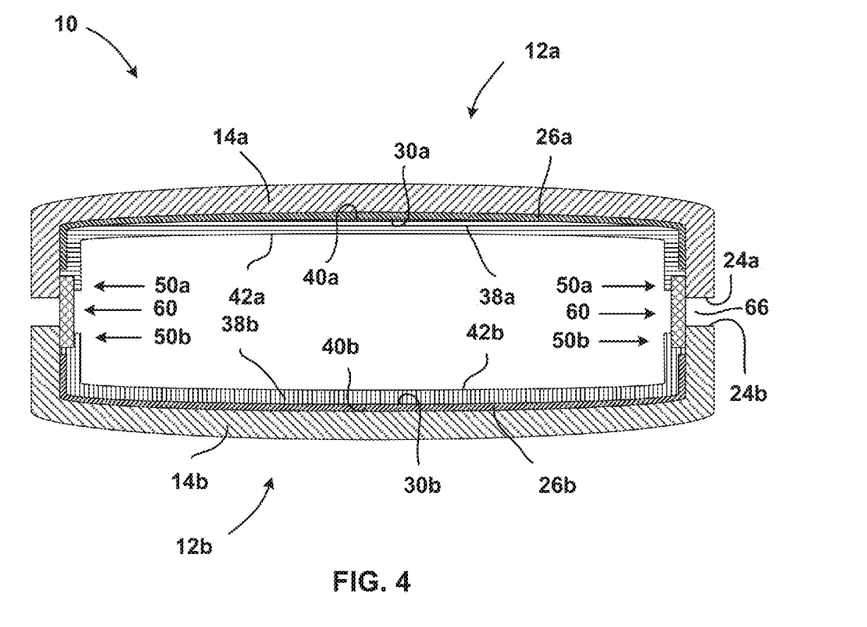
FIG. 4 is a cross-sectional view taken along line 2-2 of FIG. 1 of the first and second members of the pet chew toy of FIG. 1 with an intermediate member positioned between the first and second members.

As shown in FIG. 4, intermediate member 60 is in the form of a continuous annular frame configured to mate with each U-shaped recessed channel 50a, 50b formed in the first and second members 12a, 12b. More particularly, intermediate member 60 is shown seated in the U-shaped recessed channels 50a, 50b respectively formed by first and second members 12a, 12b, and holds the first member 12a, the second member 12b and in a fixed lateral position relative to one another. Intermediate member 60 may be high-pressure injection molded from a transparent thermoplastic polymer composition, which may particularly be transparent without tint and which may include acrylic (e.g. polymethyl methacrylate), plasticized polyvinyl chloride, polycarbonate and/or polyurethane, as well as thermoplastic elastomers.

Also as shown in FIG. 4, when first member 12a, the second member 12b and the intermediate member 60 are in a final assembly position relative to one another, a perimeter gap 66 is formed between the perimeter edges 24a, 24b of the first and second outer shells 14a, 14b.

Figure 5:
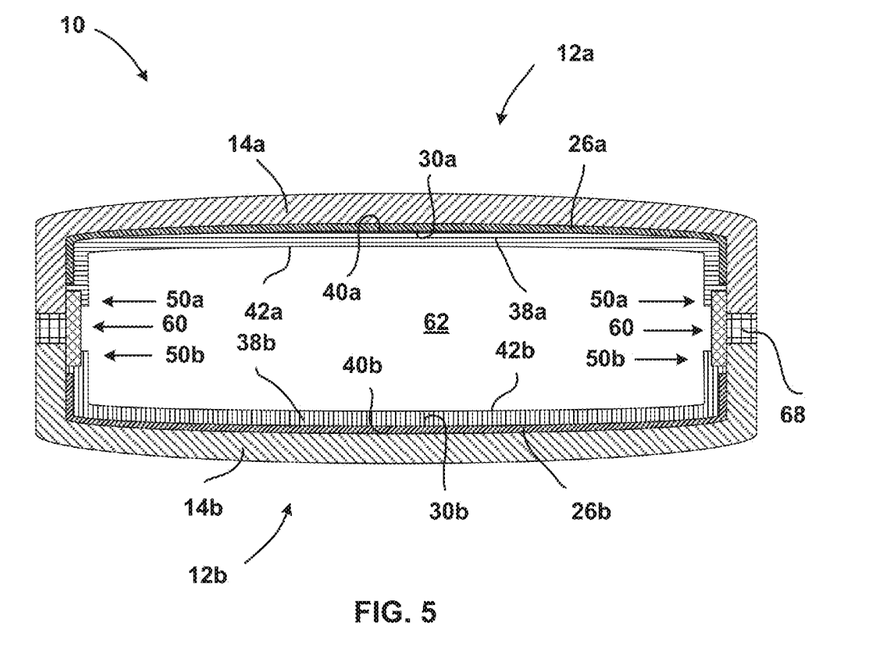
FIG. 5 is a cross-sectional view taken along line 2-2 of FIG. 1 of the pet chew toy fully assembled.

Referring now to FIG. 5, first and second members 12a, 12b and intermediate member 60 may then be placed in an injection mold, and the perimeter gap 66 may be subsequently filled with perimeter joining member 68, which may be formed from a thermoplastic polymer composition. More particularly, perimeter joining member 68 may be high-pressure injection molded from a transparent thermoplastic polymer composition, which may particularly be transparent without tint and which may include acrylic (e.g. polymethyl methacrylate), plasticized polyvinyl chloride, polycarbonate and/or polyurethane, as well as thermoplastic elastomers. In certain embodiments, the material of the perimeter joining member 68 may be the same as the material used for the first and second member inner linings 38a, 38b and the first and second member outer shells 14a, 14b.

As a result of being formed (molded) in place, perimeter joining member 68 overmolds intermediate member 60 and may form a continuous perimeter seal around the perimeter of the pet toy 10 which bonds the first member 12a, the second member 12b and intermediate member 60 together. As shown by FIG. 5, pet toy 10 is hollow, and a cavity 62 remains between the first and second members 14a, 14b and, more particularly, between the first and second member inner linings 38a, 38b of the first and second members 14a, 14b.

Figure 6:
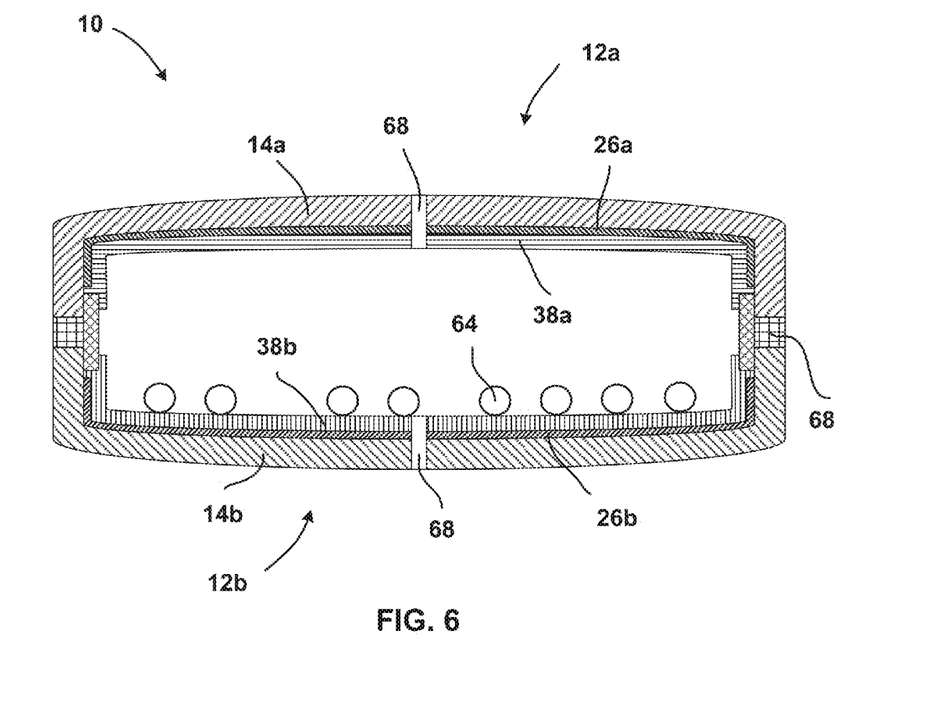
FIG. 6 is a cross-sectional view taken along line 2-2 of FIG. 1 of another embodiment of a pet chew toy according to the present disclosure.

In other embodiments, as shown in FIG. 6, the inner cavity 62 may be filled with at least one of a liquid or particulate 64 which provides a scent attractant. In order to better release the scent of the scent attractant, one or more holes 70 may be included with the molded pet chew toy 10 which extend completely through the first member 12a and/or second member 12b.

Figure 7:
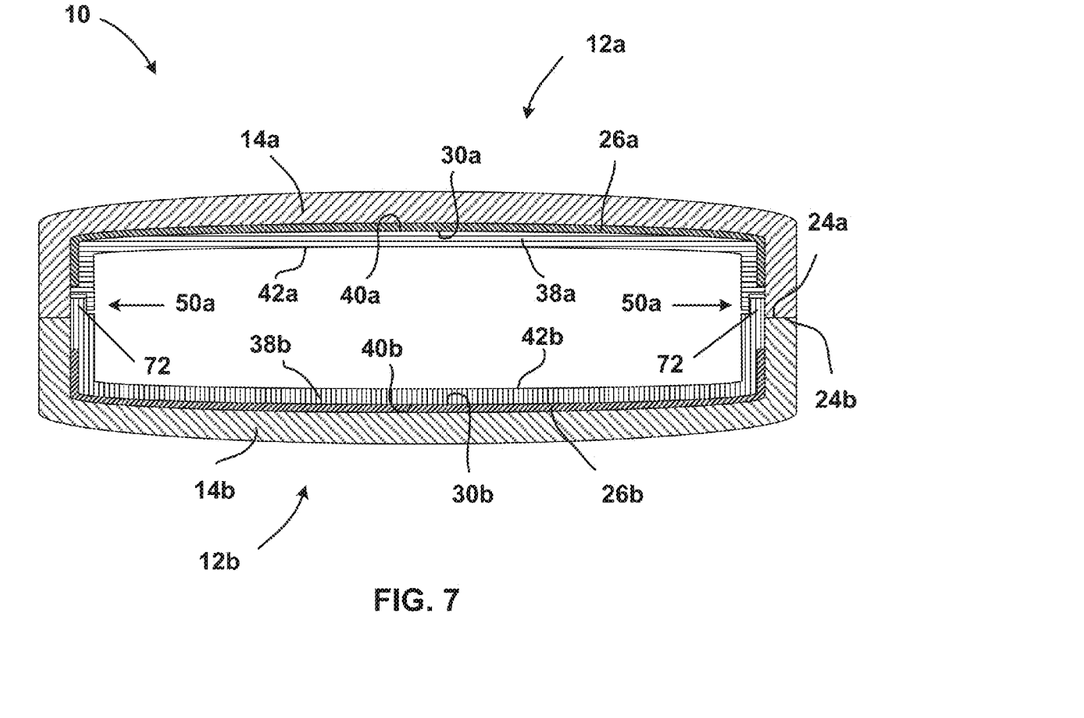
FIG. 7 is a cross-sectional view taken along line 2-2 of FIG. 1 of another embodiment of a pet chew toy according to the present disclosure.

In other embodiments, as shown in FIG. 7, the intermediate member 60 and the perimeter joining member 68 may be eliminated. More particularly, the U-shaped recessed channel 50b of second member 12b may be replaced with a protruding tongue 72 which protrudes into and is located in recess 50a of first member 12b in order to laterally position the first member 12a and the second member 12b relative to one another. In order to bond first member 12a and second member 12b to one another, perimeter edges 24a, 24b of the first and second outer shells 14a, 14b of the first and second members 12a, 12b may first be heated to an adequate bonding temperature, such as with a hot plate, and thereafter, the first member 12a and second member 12b, including perimeter edges 24a, 24b, may be brought into contact with one another to hot plate weld the perimeter edges 24a, 24b of the first and second outer shells 14a, 14b of the first and second members 12a, 12b directly together.

Figure 8:
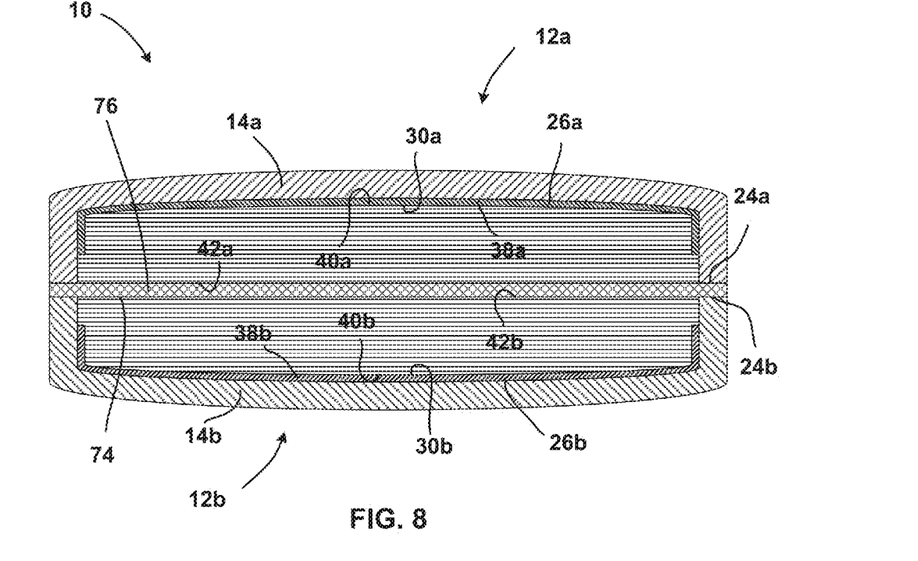
FIG. 8 is a cross-sectional view taken along line 2-2 of FIG. 1 of another embodiment of a pet chew toy according to the present disclosure.

In other embodiments, as shown in FIG. 8, the first and second member inner linings 38a, 38b may completely fill first and second member inner cavities 20a, 20b. In order to join the first and second members 12a, 12b together, the first and second members 12a, 12b may be placed into an injection mold with a gap 74 between the first and second members 12a, 12b, and more particularly between the inner surfaces 42a, 42b of the first and second member inner linings 38a, 38*b*. Thereafter, the gap 74 may be subsequently filled with a molded-in place intermediate joining member 76, which may be formed from a thermoplastic polymer composition. More particularly, joining member 76 may be high-pressure injection molded from a transparent thermoplastic polymer composition, which may particularly be transparent without tint and which may include acrylic (e.g. polymethyl methacrylate), plasticized polyvinyl chloride, polycarbonate and/or polyurethane, as well as thermoplastic elastomers. As a result of being formed (molded) in place, intermediate joining member 76 bonds the first member 12*a*, the second member 12*b* together.

Figure 9:
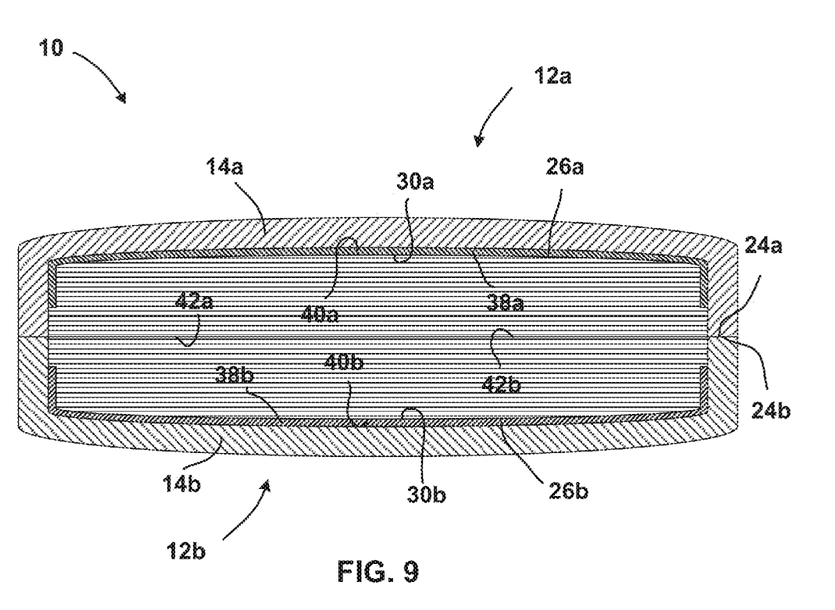
FIG. 9 is a cross-sectional view taken along line 2-2 of FIG. 1 of another embodiment of a pet chew toy according to the present disclosure.

In still other embodiments, as shown in FIG. 9, intermediate joining member 76 may be eliminated, and the first and second member inner linings 38*a*, 38*b* of the first and second members 12*a*, 12*b* may be bonded directly to one another. In order to bond first member 12*a* and second member 12*b* to one another, inner surfaces 42*a*, 42*b* of the first and second member inner linings 38*a*, 38*b* may first be heated to an adequate bonding temperature, such as with a hot plate, and thereafter, the inner surfaces 42*a*, 42*b* of the first and second member inner linings 38*a*, 38*b* may be brought into contact with one another to hot plate weld the inner surfaces 42*a*, 42*b* of the first and second member inner linings 38*a*, 38*b* of the first and second members 12*a*, 12*b* together.

With the present disclosure, a pet chew toy 10 may be provided which includes first and second member decorative sheets 26*a*, 26*b* which is enclosed in transparent first and second member outer shells 14*a*, 14*b*. In this manner, as a result of the decorative sheets 26*a*, 26*b* having a transparent plastic outer shell 14*a*, 14*b* overlying them, a pet chew toy 10 is provided with the appearance of the decorative sheets 26*a*, 26*b* being embedded and/or bonded to the transparent plastic outer shell 14*a*, 14*b*.

However, with the present disclosure, the transparent plastic outer shells 14*a*, 14*b* are not molded in place over the outer surfaces 28*a*, 28*b* of the first and second member decorative sheets 26*a*, 26*b* and bonded thereto. Rather, the transparent plastic outer shells 14*a*, 14*b* merely overlie the outer surfaces 28*a*, 28*b* of the first and second member decorative sheets 26*a*, 26*b*. As such, there is no heat or pressure applied directly to the outer surfaces 28*a*, 28*b* of the first and second member decorative sheets 26*a*, 26*b* during the formation of pet chew toy 10. As a result, virtually any decorative image 32*a*, 32*b* may be applied to the outer surfaces 28*a*, 28*b* of the first and second member decorative sheets 26*a*, 26*b* without the decorative image 32*a*, 32*b* being distorted during formation of pet chew toy 10. In other words, if the transparent plastic outer shells 14*a*, 14*b* were high-pressure injection molded in place directly to the outer surfaces 28*a*, 28*b* of the first and second member decorative sheets 26*a*, 26*b*, such may cause an image on the outer surfaces 28*a*, 28*b* of the first and second member decorative sheets 26*a*, 26*b* to distort due to the heat and pressure of the injection molding process.

In one particular embodiment of the present disclosure, the first and second member decorative sheets 26*a*, 26*b* may include an image of meat, such as bacon. Furthermore, the transparent plastic outer shells 14*a*, 14*b* may include a bacon scent, and the inner cavity 62 may include a particulate 64 made of imitation bacon to further enhance the bacon scent.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LIST OF REFERENCE CHARACTERS 10 molded pet chew toy
12 elongated member
12*a*, 12*b* first and second members of elongated member
13*a*, 13*b* first and second member front sides
14*a*, 14*b* first and second member outer shells
16*a*, 16*b* first and second member outer shell outer surfaces
18*a*, 18*b* first and second member outer shell inner surfaces
20*a*, 20*b* first and second member inner cavities
22*a*, 22*b* first and second member outer shell inner surface perimeter regions
23*a*, 23*b* first and second member outer shell perimeter regions
24*a*, 24*b* first and second member outer shell perimeter edges
26*a*, 26*b* first and second member sheets
28*a*, 28*b* first and second member sheet outer surfaces
30*a*, 30*b* first and second member sheet inner surfaces
32*a*, 32*b* first and second member sheet decorative image/opaque regions
34*a*, 34*b* first and second member sheet transparent regions
38*a*, 38*b* first and second member inner linings
40*a*, 40*b* first and second member inner lining outer surfaces
42*a*, 42*b* first and second member inner lining inner surfaces
48*a*, 48*b* first and second member intermediate member seating portions
50*a*, 50*b* first and second member recessed channels
52*a*, 52*b* first and second member recessed channel outer side walls
54*a*, 54*b* first and second member recessed channel inner side walls
56*a*, 56*b* first and second member recessed channel seats
60 intermediate member
62 inner cavity
64 particulate
66 perimeter gap
68 perimeter joining member
70 holes
72 second member inner lining protruding tongue
74 gap
76 intermediate joining member

What is claimed is:

1. A pet toy comprising:
an elongated member in the form of a bone, the elongated member comprising a first member and a second member, wherein the first member and the second member each have a front side and are arranged juxtaposed to one another with the front sides facing in opposite directions;
wherein the first member comprises a first member decorative sheet, wherein the first member decorative sheet is located between a first member outer shell and a first member inner lining;
wherein each of the first member decorative sheet, the first member outer shell and the first member inner lining are formed of plastic, and wherein the plastic of the first member outer shell is a transparent plastic;
wherein the second member comprises a second member decorative sheet, wherein the second member decorative sheet is located between a second member outer shell and a second member inner lining;

wherein each of the second member decorative sheet, the second member outer shell and the second member inner lining are formed of plastic, and wherein the plastic of the second member outer shell is a transparent plastic; and wherein at least one of the first member decorative sheet and the second member decorative sheet is transparent.

2. The pet toy of claim 1 wherein:
the first member outer shell has a first member outer shell inner surface;
the second member outer shell has a second member outer shell inner surface;
the first member decorative sheet is preformed to have a preform shape corresponding to a shape of the first member outer shell inner surface; and
the second member decorative sheet is preformed to have a preform shape corresponding to a shape of the second member outer shell inner surface.

3. The pet toy of claim 1 wherein:
the first member decorative sheet is located in a cavity of the first member outer shell and the first member inner lining occupies at least a portion the cavity; and
the second member decorative sheet is located in a cavity of the second member outer shell and the second member inner lining occupies at least a portion the cavity.

4. The pet toy of claim 1 wherein:
at least one of the first member decorative sheet and the second member decorative sheet is edible.

5. The pet toy of claim 1 wherein:
at least one of the first member decorative sheet and the second member decorative sheet has a transparent region and an opaque region.

6. The pet toy of claim 1 wherein:
at least one of the first member decorative sheet and the second member decorative sheet includes an image.

7. The pet toy of claim 1 wherein:
the first member decorative sheet has a thickness in a range of 0.05 mm to 1 mm; and
the second member decorative sheet a thickness in a range of 0.05 mm to 1 mm.

8. The pet toy of claim 1 wherein:
the first member outer shell has a thickness in a range of 1.5 mm to 5 mm; and
the second member outer shell has a thickness in a range of 1.5 mm to 5 mm.

9. The pet toy of claim 1 wherein:
the plastic of at least one of the first member outer shell and the second member outer shell includes an scent attractant.

10. The pet toy of claim 1 wherein:
the transparent plastic of at least one of the first member outer shell and the second member outer shell comprises at least one of acrylic, polyvinyl chloride, polycarbonate polyurethane and/or thermoplastic elastomer.

11. The pet toy of claim 1 further comprising:
a cavity is formed between the first member inner lining and the second member inner lining.

12. The pet toy of claim 11 wherein:
the cavity is at least partially filled with at least one of a liquid or particulate which moves in response to different orientations of the elongated member.

13. The pet toy of claim 1 wherein:
the first member comprises a first member perimeter edge formed by a perimeter edge of the first member outer shell;

the second member comprises a second member perimeter edge formed by a perimeter edge of the second member outer shell; and the first member perimeter edge and the second member perimeter edge are spaced from one another by a perimeter gap; and the perimeter gap is filled with a plastic which is bonded to the first member outer shell and the second member outer shell.

14. The pet toy of claim 1 wherein:
the first member and the second member are spaced from one another by an intermediate member.

15. The pet toy of claim 14 wherein:
the intermediate member is seated in a first member elongated channel of the first member and a second member elongated channel of the second member.

16. The pet toy of claim 15 wherein:
the first member elongated channel is at least partially formed by the first member inner lining; and
the second member elongated channel is at least partially formed by the second member inner lining.

17. The pet toy of claim 1 wherein:
the first member comprises a first member perimeter edge;
the first member includes an elongated channel adjacent the first member perimeter edge;
the second member comprises a second member perimeter edge;
the second member includes a tongue adjacent the second member perimeter edge; and
wherein the second member tongue is located in the first member elongated recess.

18. The pet toy of claim 1 wherein:
at least one of the first member outer shell and the second member outer shell are bonded directly to one another and the first member inner lining and the second member inner lining are bonded directly to one another.

19. The pet toy of claim 11 wherein:
at least one of the first member and the second member includes one or more holes which extend through the first or second member, respectively, to the cavity; and
the cavity is at least partially filled with a scent attractant.

20. The pet toy of claim 19 wherein:
at least one of the first member decorative sheet and the second member decorative sheet includes an image representative of a scent provided by the scent attractant.

21. A pet toy comprising:
an elongated member in the form of a bone, the elongated member comprising a first member and a second member, wherein the first member and the second member each have a front side and are arranged juxtaposed to one another with the front sides facing in opposite directions;

wherein the first member comprises a first member decorative sheet, wherein the first member decorative sheet is located between a first member outer shell and a first member inner lining;

wherein each of the first member decorative sheet, the first member outer shell and the first member inner lining are formed of plastic, and wherein the plastic of the first member outer shell is a transparent plastic;

wherein the second member comprises a second member decorative sheet, wherein the second member decorative sheet is located between a second member outer shell and a second member inner lining;

wherein each of the second member decorative sheet, the second member outer shell and the second member inner lining are formed of plastic, and wherein the plastic of the second member outer shell is a transparent plastic; and wherein at least one of the first member decorative sheet and the second member decorative sheet is edible.

22. The pet toy of claim 21 wherein:
the first member outer shell has a first member outer shell inner surface;
the second member outer shell has a second member outer shell inner surface;
the first member decorative sheet is preformed to have a preform shape corresponding to a shape of the first member outer shell inner surface; and
the second member decorative sheet is preformed to have a preform shape corresponding to a shape of the second member outer shell inner surface.

23. The pet toy of claim 21 wherein:
the first member decorative sheet is located in a cavity of the first member outer shell and the first member inner lining occupies at least a portion the cavity; and
the second member decorative sheet is located in a cavity of the second member outer shell and the second member inner lining occupies at least a portion the cavity.

24. The pet toy of claim 21 wherein:
at least one of the first member decorative sheet and the second member decorative sheet is transparent.

25. The pet toy of claim 21 wherein:
at least one of the first member decorative sheet and the second member decorative sheet has a transparent region and an opaque region.

26. The pet toy of claim 21 wherein:
at least one of the first member decorative sheet and the second member decorative sheet includes an image.

27. The pet toy of claim 21 wherein:
the first member decorative sheet has a thickness in a range of 0.05 mm to 1 mm; and
the second member decorative sheet a thickness in a range of 0.05 mm to 1 mm.

28. The pet toy of claim 21 wherein:
the first member outer shell has a thickness in a range of 1.5 mm to 5 mm; and
the second member outer shell has a thickness in a range of 1.5 mm to 5 mm.

29. The pet toy of claim 21 wherein:
the plastic of at least one of the first member outer shell and the second member outer shell includes an scent attractant.

30. The pet toy of claim 21 wherein:
the transparent plastic of at least one of the first member outer shell and the second member outer shell comprises at least one of acrylic, polyvinyl chloride, polycarbonate polyurethane and/or thermoplastic elastomer.

31. The pet toy of claim 21 further comprising:
a cavity is formed between the first member inner lining and the second member inner lining.

32. The pet toy of claim 31 wherein:
the cavity is at least partially filled with at least one of a liquid or particulate which moves in response to different orientations of the elongated member.

33. The pet toy of claim 21 wherein:
the first member comprises a first member perimeter edge formed by a perimeter edge of the first member outer shell;
the second member comprises a second member perimeter edge formed by a perimeter edge of the second member outer shell; and
the first member perimeter edge and the second member perimeter edge are spaced from one another by a perimeter gap; and
the perimeter gap is filled with a plastic which is bonded to the first member outer shell and the second member outer shell.

34. The pet toy of claim 21 wherein:
the first member and the second member are spaced from one another by an intermediate member.

35. The pet toy of claim 34 wherein:
the intermediate member is seated in a first member elongated channel of the first member and a second member elongated channel of the second member.

36. The pet toy of claim 35 wherein:
the first member elongated channel is at least partially formed by the first member inner lining; and
the second member elongated channel is at least partially formed by the second member inner lining.

37. The pet toy of claim 21 wherein:
the first member comprises a first member perimeter edge;
the first member includes an elongated channel adjacent the first member perimeter edge;
the second member comprises a second member perimeter edge;
the second member includes a tongue adjacent the second member perimeter edge; and
wherein the second member tongue is located in the first member elongated recess.

38. The pet toy of claim 21 wherein:
at least one of the first member outer shell and the second member outer shell are bonded directly to one another and the first member inner lining and the second member inner lining are bonded directly to one another.

39. The pet toy of claim 31 wherein:
at least one of the first member and the second member includes one or more holes which extend through the first or second member, respectively, to the cavity; and
the cavity is at least partially filled with a scent attractant.

40. The pet toy of claim 39 wherein:
at least one of the first member decorative sheet and the second member decorative sheet includes an image representative of a scent provided by the scent attractant.

* * * * *